United States Patent
Heim et al.

(10) Patent No.: US 10,151,342 B2
(45) Date of Patent: Dec. 11, 2018

(54) ROLLING BEARING ARRANGEMENT HAVING A STRAIN SENSOR DEVICE

(71) Applicant: Schaeffler Technologies AG & Co. KG, Herzogenaurach (DE)

(72) Inventors: Jens Heim, Bergrheinfeld (DE); Andreas Frühwald, Baudenbach (DE); Jörg-Oliver Hestermann, Aurachtal (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/763,332

(22) PCT Filed: Sep. 20, 2016

(86) PCT No.: PCT/DE2016/200438
§ 371 (c)(1),
(2) Date: Mar. 26, 2018

(87) PCT Pub. No.: WO2017/054813
PCT Pub. Date: Apr. 6, 2017

(65) Prior Publication Data
US 2018/0283447 A1 Oct. 4, 2018

(30) Foreign Application Priority Data

Oct. 1, 2015 (DE) .................. 10 2015 218 993

(51) Int. Cl.
*F16C 19/52* (2006.01)
*F16C 33/58* (2006.01)
(Continued)

(52) U.S. Cl.
CPC .......... *F16C 19/522* (2013.01); *F16C 33/581* (2013.01); *F16C 33/586* (2013.01);
(Continued)

(58) Field of Classification Search
CPC .................. F16C 19/522; G01L 1/32
See application file for complete search history.

(56) References Cited

U.S. PATENT DOCUMENTS

| 4,089,216 A | 5/1978 | Elias |
| 4,203,319 A * | 5/1980 | Lechler .................. B23Q 17/09 |
| | | 73/862.49 |

(Continued)

FOREIGN PATENT DOCUMENTS

| DE | 4218949 A1 | 12/1993 |
| DE | 10250340 A1 | 5/2004 |

(Continued)

*Primary Examiner* — Thomas R Hannon
(74) *Attorney, Agent, or Firm* — Adam R. Southworth

(57) ABSTRACT

Rolling bearing arrangements are disclosed. The bearing may include an outer ring, an inner ring, and a strain sensor device having an annular main body. The strain sensor device may be connected to the outer ring and configured to measure axial loads acting on the rolling bearing. A circle segment-shaped force introduction element may extend in a circumferential direction and connect to the annular main body via a web-shaped coupling element. The strain sensor device may have, on an outer end facing away from the rolling bearing, a recess for accommodating a strain sensor. The recess may extend over the force introduction element at least in the circumferential direction and the coupling element may have a smaller extent in a radial direction than the recess.

16 Claims, 2 Drawing Sheets

(51) Int. Cl.
*F16C 35/077* (2006.01)
*G01L 1/22* (2006.01)
*F16C 35/067* (2006.01)
*F16C 19/18* (2006.01)

(52) U.S. Cl.
CPC .......... *F16C 35/067* (2013.01); *F16C 35/077* (2013.01); *G01L 1/22* (2013.01); *F16C 19/184* (2013.01)

(56) References Cited

U.S. PATENT DOCUMENTS

| | | | |
|---|---|---|---|
| 6,338,281 B1 * | 1/2002 | El-Ibiary | G01L 5/0019 73/862.381 |
| 7,316,168 B2 * | 1/2008 | van der Knokke | G01L 5/0019 73/862.49 |
| 8,313,242 B2 * | 11/2012 | Norimatsu | B60B 27/0005 384/448 |
| 2004/0261543 A1 | 12/2004 | Van Leeuwen | |

FOREIGN PATENT DOCUMENTS

| | | |
|---|---|---|
| DE | 102006021707 A1 | 11/2007 |
| DE | 102007043392 A1 | 3/2009 |
| DE | 102007050093 A1 | 4/2009 |
| DE | 102009021469 A1 | 11/2010 |
| DE | 102010048546 A1 | 4/2012 |
| DE | 102013222151 A1 | 4/2015 |
| FR | 2708044 A1 | 1/1995 |
| JP | H06307460 A | 11/1994 |
| JP | 2001200841 | 7/2001 |
| JP | 2011149812 A | 8/2001 |

* cited by examiner

ROLLING BEARING ARRANGEMENT HAVING A STRAIN SENSOR DEVICE

CROSS-REFERENCE TO RELATED APPLICATIONS

This application is the U.S. National Phase of PCT Appln. No. PCT/DE2016/200438 filed Sep. 20, 2016, which claims priority to DE 102015218993.7 filed Oct. 1, 2015, the entire disclosures of which are incorporated by reference herein.

TECHNICAL FIELD

The present disclosure relates to a bearing arrangement, in particular a rolling bearing arrangement having a strain sensor device for measuring axial loads acting on the rolling bearing. It can be used in any type of axial bearing to detect forces that occur.

BACKGROUND

DE 10 2009 021 469 A1 shows a sensor bearing unit comprising a rolling bearing having a sensor housing, which is arranged on a bearing ring and has an integrated sensor device for detecting bearing operating states. The sensor housing is designed as an adapter ring resting against a free circumferential surface or end face of a bearing ring. The sensor device can have a sensor for force measurement, for example, said sensor being arranged on the inside of an adapter ring leg resting against an end face of the outer bearing ring.

DE 102 50 340 A1 describes a force-measuring bearing designed as a rolling bearing and having a bearing component made of steel. The bearing component can be designed as a bearing ring of a radial rolling bearing or a bearing washer of an axial rolling bearing. A strain gauge designed as a thick film is fused onto the steel component in a common operation with or in separate working steps from the heat treatment of the steel. The strain gauge can be arranged in a circumferential groove of the bearing ring or on an end or outer circumferential surface of the bearing washer.

DE 42 18 949 A1 contains a rolling bearing having a force-measuring device. The force-measuring device is designed as a force-measuring film and can be connected directly to one of the bearing rings or connected indirectly to the rolling bearing via an intermediate member.

DE 10 2006 021 707 A1 shows a bearing arrangement comprising a spindle supported by means of rolling bearings and a piezoelectric sensor surrounding a spindle journal of the spindle in an annular manner. The sensor is used to measure axial loads acting on the rolling bearing.

The disadvantage with the available force-measuring systems based on strain gauges is that they have only limited suitability for use in screw drive bearings since they generally require a large amount of installation space and do not allow a sufficiently large clearance for the screw drive. Although piezoelectric-based rings for force measurement which require little installation space and are suitable for screw drive bearings in terms of diameter are known, they are not suitable in this form for static measurements.

SUMMARY

It is thus an object of the present disclosure to make available a rolling bearing arrangement having a strain sensor device for measuring axial loads acting on the rolling bearing, wherein, for example, the rolling bearing is designed as a screw drive bearing. The strain sensor device may be of compact construction and require little installation space. Moreover, the intention is to provide an arrangement comprising a rolling bearing arrangement of this kind and a spindle supported by rolling bearings.

To solve the object according to the disclosure, use is made of rolling bearing arrangements as described herein and shown in the figures.

The rolling bearing arrangement according to an embodiment of the disclosure comprises a rolling bearing having an outer ring and an inner ring and a strain sensor device, which is integrated into the outer ring or fastened to the outer ring, for measuring axial loads acting on the rolling bearing. The strain sensor device has an annular main body. It is essential to the disclosure that the strain sensor device has, on its inner end, at least one force introduction element extending in the circumferential direction in the shape of a circle segment. The force introduction element is connected to the annular main body via at least one web-shaped coupling element. The strain sensor device has, on its outer end facing away from the rolling bearing, at least one recess for accommodating a strain sensor. The recess extends at least over the force introduction element in the circumferential direction. The coupling element has a smaller extent in the radial direction than the recess. The annular main body is secured to the frame.

One significant advantage of the rolling bearing arrangement according to the disclosure may be regarded as the fact that there is a large strain only in the region of the recess, in which the measurement by the strain sensor takes place. Via the force introduction element and the coupling element, the force is introduced specifically into the region of the recess. However, the stiffness of the overall system is retained. This is advantageous particularly if the rolling bearing is used to support feed screws since, in the case of feed screws, the stiffness of the overall system should not be negatively affected by force measurement. The large increase in strain which occurs in the region of the recess allows axial force measurement in the direction of tension and compression of the bearing in a small installation space.

The strain sensor device can be embodied as a separate component which is fastened to the end of the outer ring. The strain sensor device is preferably fastened by mechanical fasteners, e.g. screws. The use of a strain sensor device in the form of a separate ring enables the strain sensor device to be mounted with little effort on different bearings and allows replacement of sensor devices which are no longer functional. If required, the rolling bearing and the attached strain sensor device can be delivered as a modular unit.

As an alternative, the strain sensor device can also be designed as an integral edge region of the outer ring. This embodiment has the advantage that there is no need to stock a separate component, and this makes assembly easier. In this case, furthermore, no additional installation space is required for the strain sensor device. However, corresponding modifications must be made to the outer ring.

The strain sensor of the strain sensor device is preferably designed as a strain gauge. It can likewise also consist of sensor layers applied in the region of the diameter constriction. However, restriction to the strain sensor embodiments mentioned is not intended.

According to one embodiment, the strain sensor device has two symmetrically arranged force introduction elements and accordingly has two coupling elements and two recesses, each for accommodating one strain sensor.

The bearing arrangement according to an embodiment of the disclosure comprises a rolling bearing having an outer ring and an inner ring, a strain sensor device, which is integrated into the outer ring or fastened to the outer ring, for measuring axial loads acting on the rolling bearing, wherein the strain sensor device has an annular main body, and a spindle supported by rolling bearings. The strain sensor device has, on its inner end, at least one force introduction element extending in the circumferential direction in the shape of a circle segment. The force introduction element is connected to the annular main body via at least one web-shaped coupling element. The strain sensor device has, on its outer end facing away from the rolling bearing, at least one recess for accommodating a strain sensor. The recess extends at least over the force introduction element in the circumferential direction. The coupling element has a smaller extent in the radial direction than the recess. The annular main body is secured to the frame.

According to an embodiment, the bearing arrangement comprises a machine frame for the axial support of the spindle. The strain sensor device is preferably fastened to an end of the outer ring and to an end of the machine frame. To fasten the strain sensor device, use may be made of mechanical fasteners, e.g. screws.

It has furthermore proven advantageous to fit the bearing arrangement with an evaluation unit, which is connected to the strain sensor and which processes the data supplied by the strain sensor.

BRIEF DESCRIPTION OF THE DRAWINGS

Example embodiments of the disclosure and the advantages and details thereof are explained in greater detail below by the attached figures, of which.

DETAILED DESCRIPTION

Figure 1:
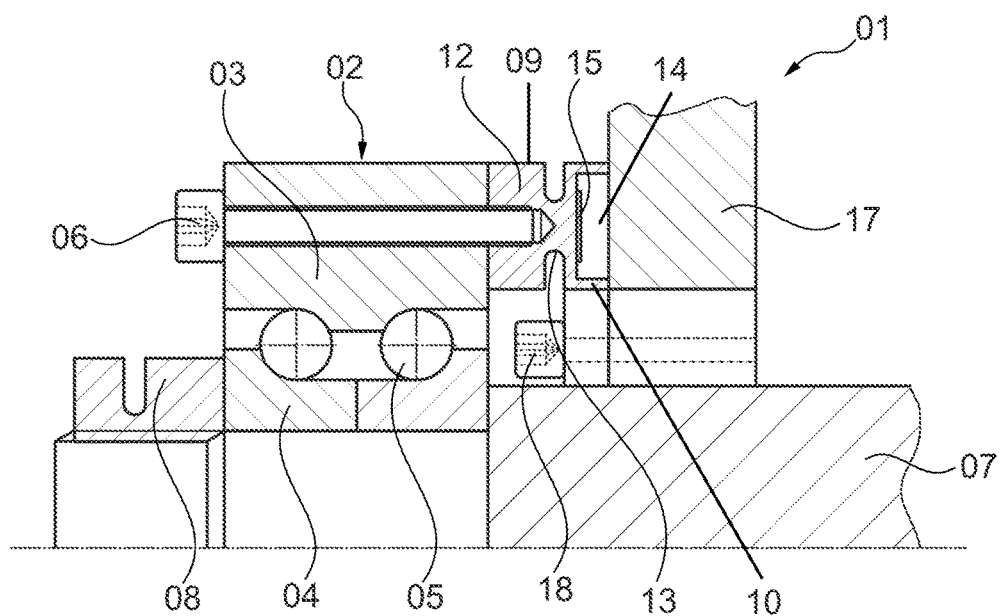
FIG. 1 shows a section through a bearing arrangement according to the disclosure in a first embodiment.

FIG. 1 shows a section through a bearing arrangement 01 according to the disclosure in a first embodiment. The arrangement 01 according to the disclosure first of all comprises a rolling bearing 02 having an outer ring 03, an inner ring 04 and rolling elements 05 arranged between the outer ring 03 and the inner ring 04. In the embodiment shown, the rolling bearing is embodied as a double-row axial angular contact ball bearing. Of course, other suitable rolling bearings are possible. The rolling bearing 02 is used to support a spindle 07. The spindle 07 is preferably the threaded spindle of a screw drive. The rolling bearing 02 is fastened to the spindle 07 by a shaft nut 08.

Figure 2:
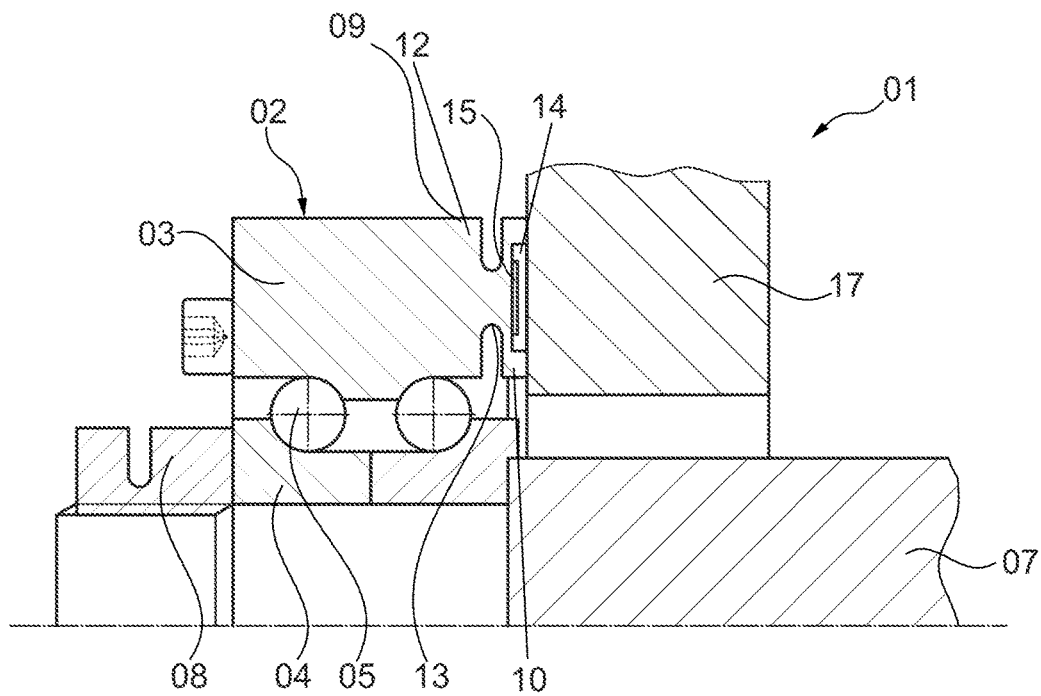
FIG. 2 shows a section through the bearing arrangement according to the disclosure in a second embodiment.
Figure 3A:
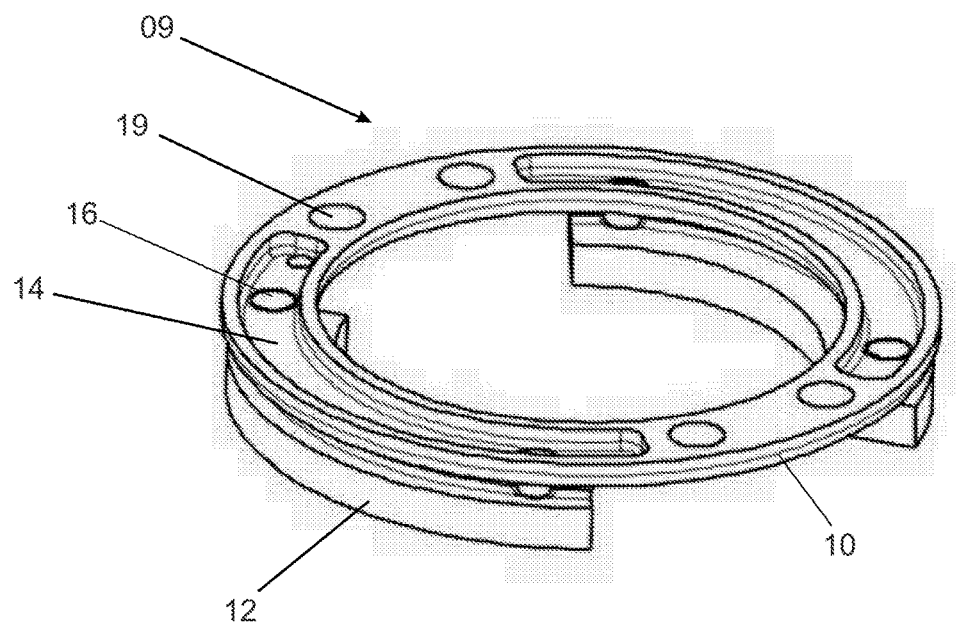
FIG. 3 shows two perspective views of a strain sensor device.
Figure 3B:
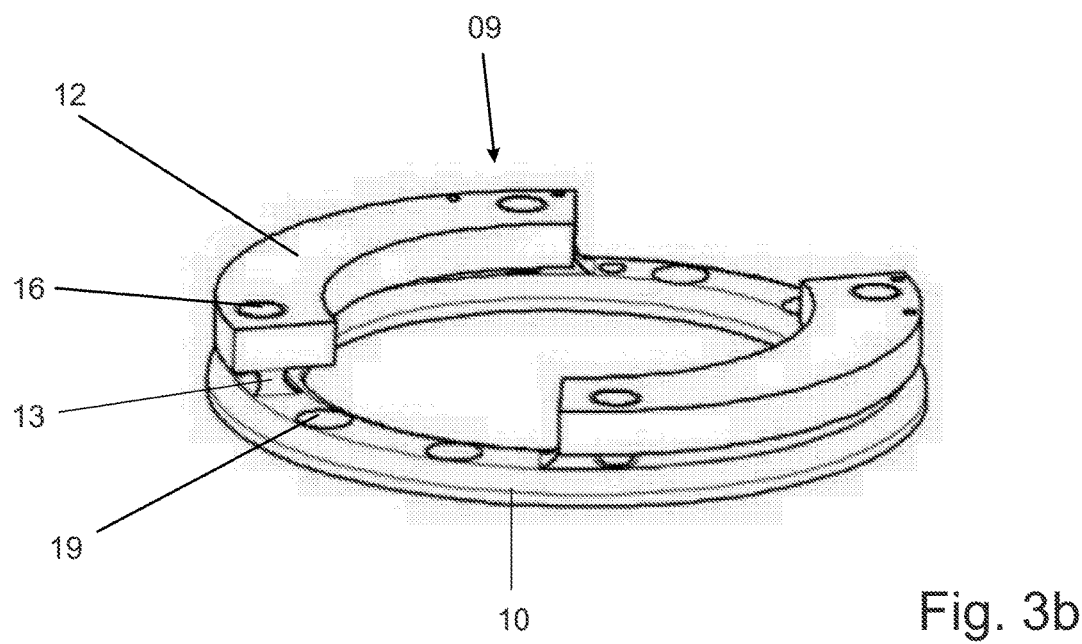

The bearing arrangement 01 furthermore comprises a strain sensor device 09, which is shown in detail in FIG. 3. In particular, it is possible to see from FIG. 3a the design of the outer end of the strain sensor device 09 which faces away from the rolling bearing 02. In particular, FIG. 3b shows the side of the strain sensor device 09 which faces the rolling bearing 02. The strain sensor device 09 is fastened to the end face of the outer ring 03 by screws 06. It has an annular main body 10, which has two symmetrically arranged force introduction elements 12 on its inner end. The force introduction elements 12 extend in the circumferential direction in the shape of a circle segment. They are connected to the annular main body 10 via a web-shaped coupling element 13 in each case. Two recesses 14 are formed in the outer side of the main body 10, which faces away from the rolling bearing 02. The recesses 14 extend in the circumferential direction over the force introduction elements 12. The coupling elements 13 have a shorter extent in the radial direction than the recesses 14. A strain sensor 15 is arranged in each of the recesses 14 (see FIGS. 1 and 2). The strain sensor 15 can be embodied, for example, as a strain gauge or in the form of sensor layers, which are applied in the region of the recesses 14.

To fasten the strain sensor device 09 to the outer ring 03, use is made of the screws 06, which extend through the outer ring 03 into the force introduction elements 12. The holes 16 are provided with a corresponding internal thread. The strain sensor device 09 is situated between the outer ring 03 and a machine frame 17. The machine frame 17 is used for axial support of the spindle 07. The strain sensor device 09 is fixed on the end of the machine frame 17 by screws 18. Corresponding holes 19 are formed in the outer end of the strain sensor device 09 to enable the screws 18 to pass through.

The bearing arrangement 01 may be fitted with an evaluation unit (not shown), which is connected to the strain sensor 15 and correspondingly processes the data supplied by the strain sensor 15.

Via the force introduction elements 12, the force is introduced into the strain sensor device 09. The web-shaped coupling elements 13 press on the regions in which the recesses 14 are situated and produce force-dependent strains in the recesses 14. In the region of the force introduction elements 12 there is a large increase in strain when forces acting in the axial direction occur, and this increase is used for force measurement by the strain sensor 15. The strain sensor 15 is strained in accordance with the forces which occur and then delivers a measurement signal. In this way, the axial bearing load can be measured directly in the force transmission path, wherein only a small installation space is required for the sensor overall.

FIG. 2 shows a section through the bearing arrangement 01 according to the disclosure in a second embodiment. In contrast to the embodiment already described, the strain sensor device 09 is not embodied as a separate component here but is formed integrally in the edge region of the outer ring 03. Thus, no additional installation space is required for the strain sensor device 09.

FIG. 3 shows two perspective views of the strain sensor device 09. In particular, the web-shaped coupling element 13, which extends between the force introduction element 12 and the annular main body 10, is readily visible here. In the example illustrated, the force introduction element 12 consists of two circle-segment-shaped sections which lie opposite one another in an axially symmetrical manner, thereby avoiding tilting of the bearing when axial forces are introduced. In modified embodiments, a plurality of circle-segment-shaped sections can be provided, or a single force introduction element 12 may optionally extend over the entire circumference.

LIST OF REFERENCE SIGNS 01 arrangement
02 rolling bearing
03 outer ring
04 inner ring
05 rolling element
06 screw
07 spindle 08 shaft nut
09 strain sensor device
10 annular main body
11
12 force introduction elements
13 coupling element
14 recesses
15 strain sensor
16 holes
17 machine frame
18 screw
19 holes

The invention claimed is:

1. A rolling bearing arrangement comprising:
a rolling bearing having an outer ring and an inner ring; and
a strain sensor device, which is integrated into the outer ring or fastened to the outer ring, and configured to measure axial loads acting on the rolling bearing, wherein the strain sensor device has an annular main body;
wherein the strain sensor device has, on an inner end, at least one force introduction element extending in a circumferential direction in a shape of a circle segment, and the force introduction element is connected to the annular main body via at least one web-shaped coupling element;
wherein the strain sensor device has, on an outer end facing away from the rolling bearing, at least one recess for accommodating a strain sensor, wherein the recess extends over the force introduction element at least in the circumferential direction, wherein the coupling element has a smaller extent in a radial direction than the recess; and in that the annular main body is secured to a frame.

2. The rolling bearing arrangement as claimed in claim 1, wherein the strain sensor device is embodied as a separate component, and it is fastened to an end of the outer ring.

3. The rolling bearing arrangement as claimed in claim 1, wherein the strain sensor device is integrated in an edge region of the outer ring.

4. The rolling bearing arrangement as claimed in claim 1, wherein the strain sensor is a strain gauge.

5. The rolling bearing arrangement as claimed in claim 1, wherein the strain sensor includes sensor layers applied in a region of the recess.

6. The rolling bearing arrangement as claimed in claim 1, wherein the strain sensor device comprises two symmetrically arranged force introduction elements and two recesses, each for accommodating one strain sensor.

7. A bearing arrangement comprising:
a rolling bearing having an outer ring and an inner ring;
a strain sensor device, which is integrated into the outer ring or fastened to the outer ring, and configured to measure axial loads acting on the rolling bearing, wherein the strain sensor device has an annular main body;
a spindle supported by rolling bearings;
wherein the strain sensor device has, on an inner end, at least one force introduction element extending in a circumferential direction in a shape of a circle segment, wherein the force introduction element is connected to the annular main body via at least one web-shaped coupling element; and
wherein the strain sensor device has, on an outer end facing away from the rolling bearing, at least one recess for accommodating a strain sensor, wherein the recess extends at least over the force introduction element in the circumferential direction, wherein the coupling element has a smaller extent in a radial direction than the recess, and in that the annular main body is secured to a frame.

8. The bearing arrangement as claimed in claim 7, wherein it has a machine frame for axial support of the spindle.

9. The bearing arrangement as claimed in claim 8, wherein the strain sensor device is fastened to an end of the outer ring and to an end of the machine frame.

10. The bearing arrangement as claimed in claim 7, wherein it comprises an evaluation unit, which is connected to the strain sensor, and is configured to process data supplied by the strain sensor.

11. A rolling bearing, comprising:
an outer ring;
an inner ring;
a strain sensor device having an annular main body, connected to the outer ring, and configured to measure axial loads acting on the rolling bearing;
a circle segment-shaped force introduction element extending in a circumferential direction and connected to the annular main body via a web-shaped coupling element;
the strain sensor device has, on an outer end facing away from the rolling bearing, a recess for accommodating a strain sensor; and
the recess extends over the force introduction element at least in the circumferential direction and the coupling element has a smaller extent in a radial direction than the recess.

12. The rolling bearing arrangement as claimed in claim 11, wherein the strain sensor device is embodied as a separate component, and it is fastened to an end of the outer ring.

13. The rolling bearing arrangement as claimed in claim 11, wherein the strain sensor device is integrated in an edge region of the outer ring.

14. The rolling bearing arrangement as claimed in claim 11, wherein the strain sensor is a strain gauge.

15. The rolling bearing arrangement as claimed in claim 11, wherein the strain sensor includes sensor layers applied in a region of the recess.

16. The rolling bearing arrangement as claimed in claim 11, wherein the strain sensor device comprises two symmetrically arranged force introduction elements and two recesses, each for accommodating one strain sensor.

* * * * *